Dec. 16, 1941.                C. O. BRUESTLE                2,266,408
                                REEL ARBOR
                            Filed Dec. 23, 1939
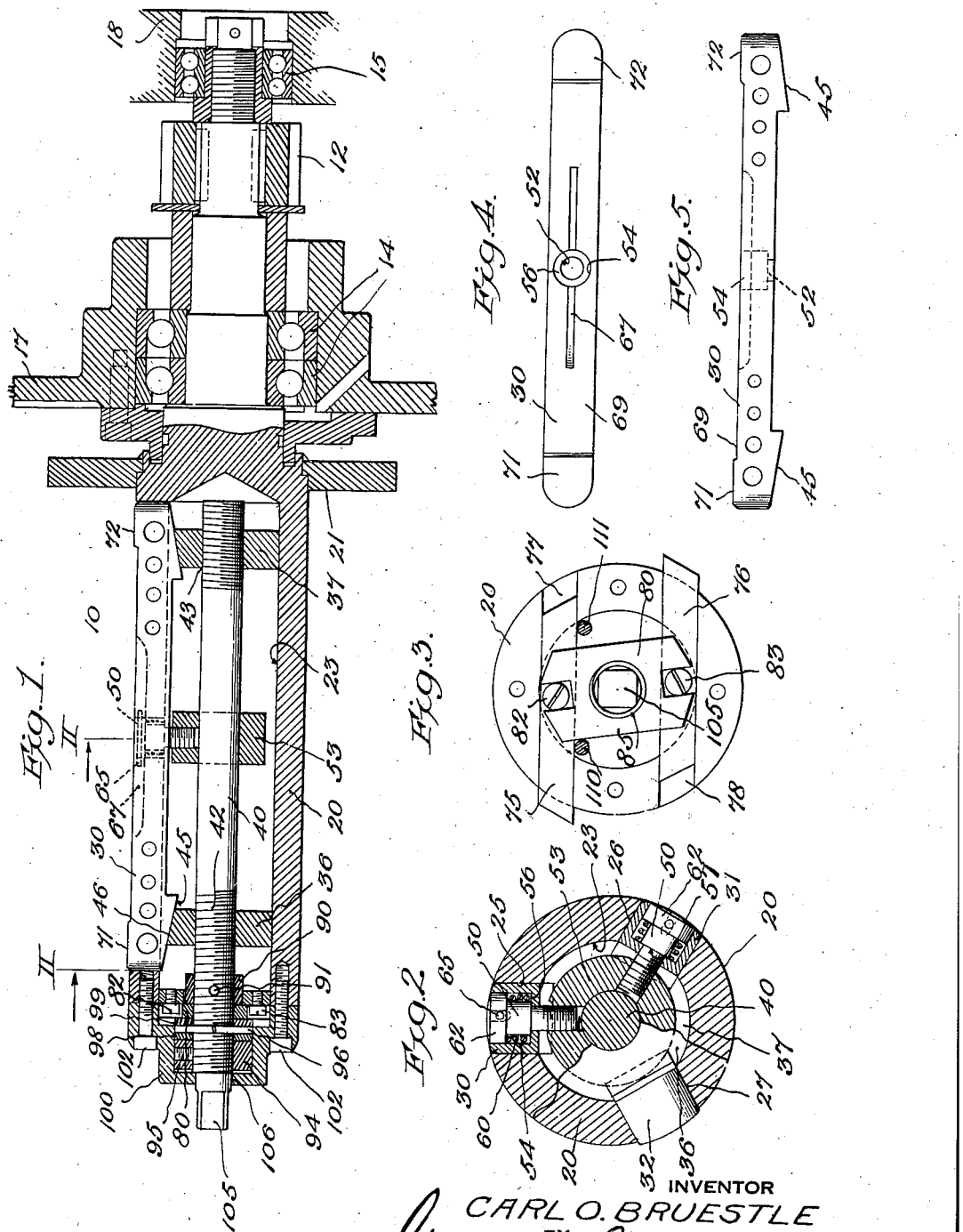

Patented Dec. 16, 1941

2,266,408

UNITED STATES PATENT OFFICE 2,266,408

REEL ARBOR

Carl O. Bruestle, Rahway, N. J., assignor to Elevator Supplies Company, Incorporated, Rahway, N. J., a corporation of New Jersey Application December 23, 1939, Serial No. 310,681

4 Claims. (Cl. 242—72)

This invention relates to reel arbors for winding machines, and especially to the reel arbors of high speed machines for winding wire, and provides improvements therein.

In winding the finer sizes of wire, the reel arbor is operated at speeds ranging from about 2000 to 8000 revolutions per minute. To avoid vibration of the arbors and reels, especially at the higher speeds, it is necessary that the reels be very carefully centered on the driving arbor. The reels for these high speed machines are accurately formed, being manufactured true to specifications, the arbor shaft being ground to size, and the reel dynamically balanced. Heretofore the useful life of the spools has been limited. Shocks transmitted to the reel in starting and stopping the reel arbor, distort the reel and the driving connections between the arbor and the reel (which is usually a pin-and-slot arrangement), and when this occurs, the reels must be discarded.

In my application Serial Number 297,297 (Series of 1935) I have shown and disclosed an improved reel arbor. The present invention is an alternative, and, like that shown and described in said application Serial Number 297,297, provides a reel arbor constructed so that the reel is securely fastened and held in a truly centered position on the arbor, in such manner that the reel is not distorted or injured by the sudden starting and stopping of the arbor, and the reel is thereby given an increased useful life.

The invention further provides a means for quickly and readily mounting and dismounting the reel from the arbor shaft. The invention may further include safety means for preventing the axial displacement of the reel in case of accidental loosening of the driving connection between the reel and the arbor during rotation, or in case of failure to fasten the reel on the arbor before starting the machine.

An embodiment of the invention is illustrated in the accompanying drawing, wherein:

Fig. 1 is a longitudinal section of the reel arbor.

Fig. 2 is a transverse section in parts of two planes, indicated by the line II—II, Fig. 1.

Fig. 3 is an end view with the cap at the left hand end removed.

Figs. 4 and 5 are respectively a top plan view and a side elevation of one of the contactor bars.

Referring to said drawing, numeral 10 designates a reel arbor which is rotated in a suitable manner, as by means (not shown) acting through a pinion 12 on the arbor. The arbor 10 turns in suitable bearings, as indicated at 14, 15, suitably mounted, as in the wall or partition 17, and a back wall or part 18 respectively of a wire drawing machine. The arbor has thereon a cylindrical portion 20. The portion 20 is preferably of a diameter which closely corresponds to the diameter of the bore of a spool or reel to be used thereon, and on which the spool or reel fits with a slight clearance when placed on the arbor. A flange 21 on the arbor may be provided for limiting the position of the spool or reel axially of the arbor.

The cylindrical portion 20 is formed with a concentric hollow portion 23, and with a plurality of longitudinal slots or openings symmetrically spaced radially around the axis of the arbor. As here shown, there are three of these radially symmetrically spaced slots 25, 26, 27. Bars, as the bars 30, 31, 32 are located in the openings 25, 26 and 27, and are arranged to have a limited radial movement in the openings, and, when projected, to extend slightly beyond the surface of the cylindrical portion of the reel, to contact with the surface of the reel at the face of the bore therein.

Means are provided for simultaneously and radially projecting the contactor bars 30, 31, 32 into binding contact with the spool or reel within its bore. These means comprise blocks 36, 37, and means, as a screw shaft 40, for imparting simultaneous movement to the said blocks. For this purpose the shaft 40 may be provided with screw threads 42, 43; and the blocks 36 provided with corresponding screw threads engaging the threads on the shaft. The screw threads 42, 43 advantageously are cut in opposite directions so that the blocks 36, 37 move toward or away from one another when the shaft 40 is turned. The blocks 36, 37 bear against the contactor bars 30, 31, 32 through cams. The cams are advantageously in the form of inclined planes 45, 46, one at each end of a contactor bar, and the other on a contiguous block 36, 37. Each of the three contactor bars illustrated has an inclined plane or cam 45 at each end, and each of the blocks 36, 37 has three inclined planes 46 thereon, spaced to correspond with the angular spacing of the contactor bars 30, 31, 32 when in place in the slots 25, 26, 27. The cams 45, at the ends of the contactor bars 30, 31, 32, the cams 46 on the blocks 36, 37, and the threads 42, 43 on the shaft 40, are symmetrical, so as to impart symmetrical movement to the contactor bars. The blocks 36, 37 are advantageously made round and have a diameter closely corresponding to the diameter of the bore 23, so as to be able to slide thereon, and at the same time be accurately guided by the surface 23.

Means are provided for limiting the outward movement of the contactor bars 30, 31, 32, and also for causing the contactor bars to follow the action of the cams. The contactor bars move radially inward and outward corresponding to the action of the cams. To this end, screws 50 pass through openings 52 in each of the contactor bars 30, 31, 32. The screws are fastened at their inner ends to a collar 53 which is loose on the shaft 40. The contactor bars 30, 31, 32 have bores 54 concentric with each of the holes 52, forming an inner shoulder 56. A coil spring 60 is provided within the bore 54 between the head 62 of the screw and the shoulder 56, and the action of the coil spring 60 is to normally press the contactor bar radially inward against the cams on the blocks 36, 37. The means for limiting the outward movement of the contactor bars 30, 31, 32 may be, as here shown a shoulder 57 on the screw 50 coacting with the shoulder 56 on a contactor bar. The shoulders 56, 57 serve to prevent the contactor bars from flying out, and also to limit the projecting of the contactor bars to a small amount, in case the arbor should be rotated without a reel or spool thereon. The screws 59 are prevented from turning and becoming loose by a pin 65 which fits in a hole running transversely through the head 62 of the screw. In order that the outer surface of the contactor bar may be unobstructed, the head 62 of the screw 50 fits within the bore 54, and the outer part of the contactor bar is provided with a slot 67 extending across the bore 54, into which slot the projecting ends of the pin 65 extend. In order to obtain a firm bearing between the contactor bars and the spool or reel, the intermediate portions of the contactor bars may be made slightly undersized, as indicated at 69, the contact with the spool or reel being made within the bore, at opposite sides or ends, by the slightly elevated portions 71, 72 at the opposite ends of the contactor bars.

Means are also preferably provided for locking the spool or reel on the arbor against axial displacement. The means for operating these means is advantageously combined with the means for operating the contactor bars. The means are also advantageously such that the locking means may be moved independently into locking position by centrifugal force, and into unlocking position by a manual effort. The locking means, as here shown, comprises one or more latch pieces 75, 76 which slide in grooves 77, 78 across the ends of the cylindrical portion 20 of the arbor. A forked arm 80 is provided for transmitting motion from the shaft 40 to a latch piece. With two latch pieces 75, 76, the part 80 is provided with two arms, as shown. The latch pieces are provided with pins or projections 82, 83 (here shown as the heads of screws) which project within the forked portions of the arm 80. The forked arm 80 has an opening 85 therein through which the shaft 40 passes, but does not have a threaded connection therewith. To provide an impositive driving connection or friction clutch between the shaft and the forked arm 80, the shaft 40 may be provided with a collar 90 which is fastened thereto in suitable manner as by means of a pin 91. On the shaft 40, and spaced from the collar 90 is another collar 94, fastened to said shaft as by means of a set screw 95. Between the collars 90 and 94 is a spiral spring washer 96, on each side of which may be plain washers 98 and 99. The spiral spring washer acts on the collars 90 and 94, through the washers 98 and 99, and also through the forked arm 80, so that there is a frictional contact between said forked arm 80 and the parts on the sides of it, as here shown, the collar 90 and the washer 99.

A cap 100 may be provided to house the parts which project beyond the outer end of the cylindrical portion 20 of the arbor, the cap 100 being secured to the aforesaid portion in suitable manner, as by means of screws 102. The outer end 105 of the shaft 40 extends through a hole 106 in the cap, and the outer end 105 of the shaft may be squared or otherwise formed to coact with a tool, as for example a wrench, in turning the shaft 40 to operate the contactor bars 30, 31, 32. Stops 110 and 111 are provided for limiting the angular movement of the forked arm 80, and these may be, as here shown, pins projecting from the cap 100.

*Operation*

Referring to Fig. 1 of the drawing, the contactor bars are illustrated as slightly extended beyond the surface of the cylindrical portion 20. To place a spool on the arbor, the shaft 40 is rotated clockwise when viewed from outside the end of squared shaft. The clockwise rotation of the shaft acts on the forked arm 80 through the impositive driving connection or friction clutch, and causes the said forked arm 80 to turn, and thereby retract the latch pieces 75, 76. The latch pieces 75, 76 could, however, be retracted manually by pressing on them at their exposed ends. The clockwise direction of rotation of shaft 40 also causes the blocks 36, 37 to move apart. The cam surfaces or inclined planes 45 on the contactor bars 30 ride down the cams or inclined faces 46, so that the group of contactor bars 30, 31, 32 can move radially inward, the inward movement of the contactor bars, in the construction illustrated, being brought about by the action of the spring 60. The radial movement of the contactor bars is symmetrical.

When the contactor bars are retracted, a spool or reel is placed on the cylindrical portion of the arbor, and moved up against the flange plate 21.

The shaft 40 is then turned in a counterclockwise direction (as by means of a wrench or crank handle, not shown). This counterclockwise rotation of the shaft 40, moves the latch pieces 75, 76 outwardly, alongside of the spool or reel when its opposite side is against the flange 21, through the forked arm 80 and the impositive connection or friction clutch heretofore described. The counterclockwise rotation of the shaft 40 also moves the blocks 36, 37 longitudinally of the arbor toward one another, the cam faces or inclined planes 45 riding up the cam faces or inclined planes 46, and causing the contactor bars 30, 31, 32 to move outward radially and symmetrically. The turning of the shaft 40 in a counterclockwise direction is continued until the contacting parts (71 and 72) of the contactor bars make firm contact with the spool or reel inside of the bore. After the latch pieces 75, 76 have reached their limit of outward projection, the shaft 40 can continue to turn by reason of the friction clutch between the shaft and the forked arm 80. Power may then be applied to the arbor to rotate the spool or reel to wind wire thereon.

The latch pieces 75, 76 during the rotation of the spindle are subjected to the action of centrifugal force in a direction to hold them extended. In their extended position they prevent any longitudinal displacement of the spool or reel on the arbor shaft in cases where the contact between contactor bars 30, 31, 32 may become loose for any reason, or where the machine may be started before the contactor bars have been extended into binding contact with the reel or spool.

In case the machine is started without a reel or spool on the arbor, the coaction of the shoulders 57 on the screws 50 with the shoulders 56 limits the projection of said contactor bars, and prevents them from being thrown out of the slots 25, 26, 27 by the action of centrifugal force.

The invention may receive other embodiments than that herein specifically illustrated and described.

What is claimed is:

1. A reel arbor for winding machines, comprising a cylindrical portion over which the central bore of a reel or spool may be mounted on the arbor, a plurality of openings in said cylindrical portion of the arbor symmetrically spaced radially around the axis of the arbor, reel contactors in said openings, and means for simultaneously projecting said reel-contactors into binding contact with the surface portion of the reel within said bore, comprising a rotatable shaft, means for locking a spool on the arbor against longitudinal displacement, and an impositive connection between said locking means and said shaft, said impositive connection acting to allow said shaft to continue its movement after the locking means have reached a limit of movement, and also allowing said locking means to move under the action of centrifugal force independently of the movement of said shaft.

2. A reel arbor according to claim 1, wherein said locking means comprises a locking-piece slidable transversely of the arbor and arranged to be contained within the circumference of the arbor in retracted position, an arm on said shaft, a driving connection between said arm and said locking piece, and a friction-clutch between said shaft and said arm.

3. A reel arbor for high speed winding machines, comprising a unitary cylindrical portion over which the central bore of an accurately formed and dynamically balanced reel may be mounted, said cylindrical portion having a diameter closely corresponding to the diameter of the bore of the reel to be used thereon, and also having a bore accurately centered with its outer cylindrical surface, a plurality of openings in said cylindrical portion symmetrically spaced radially around the axis of the arbor and extending approximately the width of the reel to be used on the arbor, reel contactor bars fitted closely within said openings and extending the length thereof, two oppositely threaded blocks having a bearing on said cylindrical portion within the bore of the latter, one adjacent one end of said reel-contactor bars and the other adjacent the opposite end of said reel contactor bars, a shaft extending through said blocks and having oppositely threaded portions engaging the threads of said blocks, oppositely arranged symmetrical inclined planes on said blocks contacting each of the reel-contactor bars at opposite ends, said threaded shaft, when turned, acting to simultaneously move said blocks to cause said inclined planes to project said reel contactors into binding contact with the surface portion of a reel within the bore thereof.

4. A reel arbor for high speed winding machines, according to claim 3, further including means for retaining said reel contactor bars against ejection when the arbor runs without a reel thereon, said retaining means comprising a collar on said shaft, headed screws fastened to said collar and passing through countersunk openings in each of said reel contactor bars, a groove in each of said contactor bars crossing said countersunk opening, slotted openings in said screws, and pins passing through said slotted openings and extending into the grooves in said contactor-bars for preventing loosening of said bar-retaining screws.

CARL O. BRUESTLE.